Aug. 19, 1969     J. KUHN     3,461,668
FREE PISTON HEAT ENGINE CONSTRUCTION FOR HEATING
THE WORKING FLUID INSIDE THE PISTON
Filed July 17, 1957     2 Sheets-Sheet 1
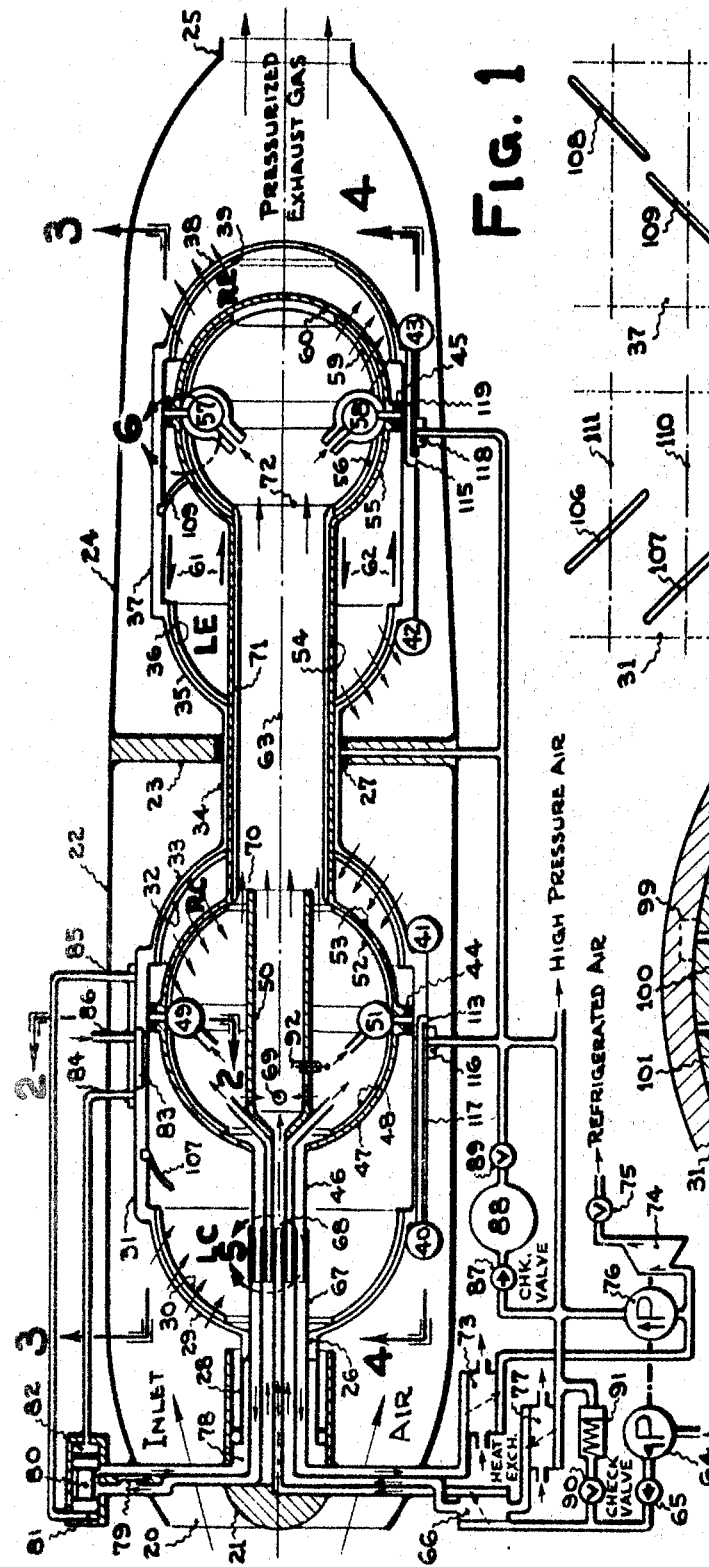
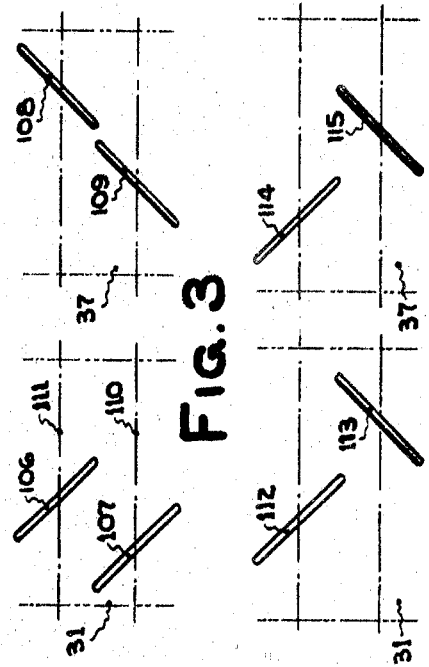
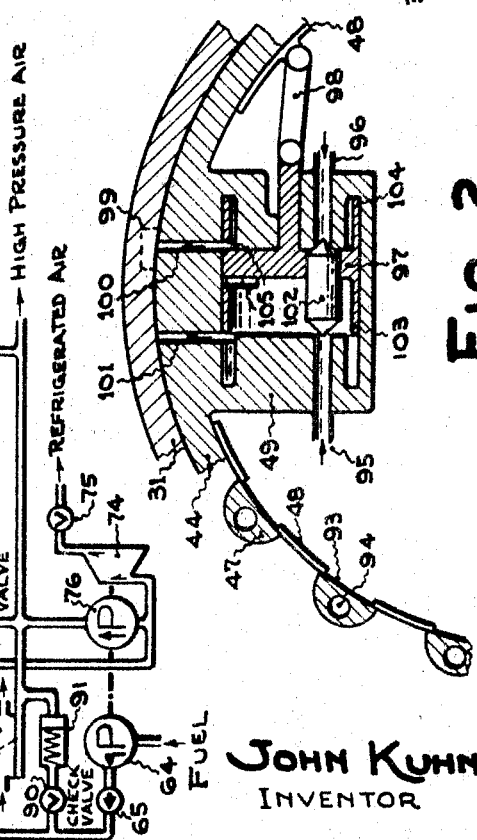
JOHN KUHN
INVENTOR

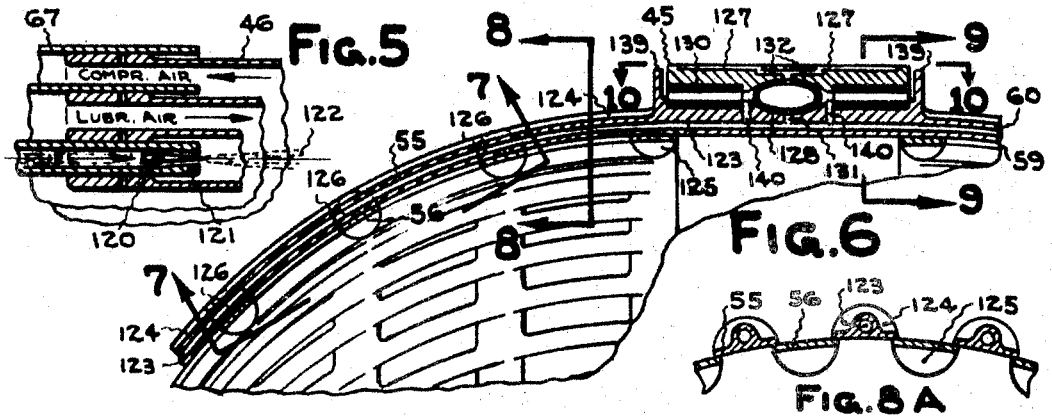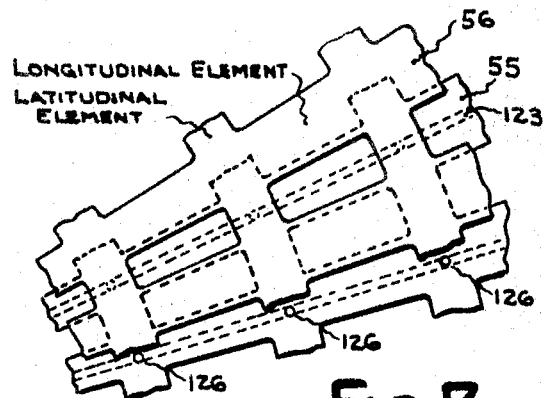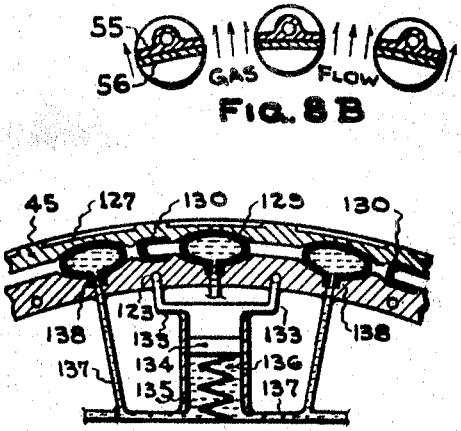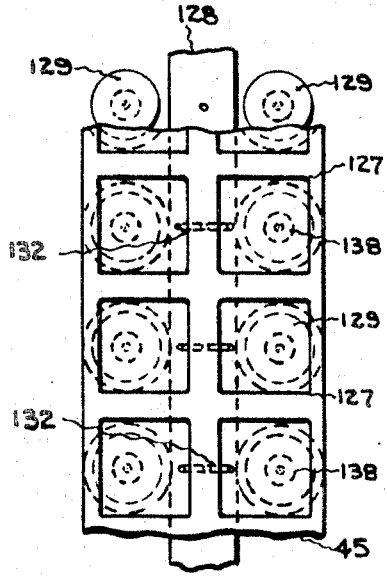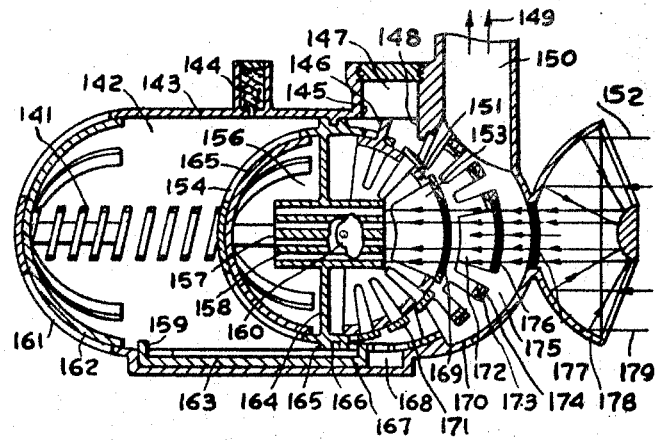

United States Patent Office 3,461,668
Patented Aug. 19, 1969

3,461,668
FREE PISTON HEAT ENGINE CONSTRUCTION FOR HEATING THE WORKING FLUID INSIDE THE PISTON
John Kuhn, 645 Las Lomas Ave.,
Pacific Palisades, Calif. 90272
Filed July 17, 1957, Ser. No. 672,452
Int. Cl. F02g 3/02; F02k 5/02
U.S. Cl. 60—39.6                              8 Claims The present invention relates generally to engines having expansible motor and compressor chambers and used for furnishing a working fluid at a pressure higher than that at which the fluid was supplied, and is more particularly concerned with engines employing a freely moving piston for energy interchange between the chambers.

The present invention is an improvement on free piston heat engine constructions in which opposite motions of the cylinder and piston can be used for inertia balancing. Invention exists in using a pressure shell structure for the piston so that a cavity is enclosed with a minimum weight of material, in placing a means for heating a working fluid by combustion of a fuel within this cavity, and in piercing the shell with valved passages so that the fluid can flow with minimum pressure loss from the compressor chamber through the heating means to the motor chamber in a manner corresponding to the motion of the piston. Further invention exists in using a pressure shell structure for the cylinder for a similar weight reduction and consequent increase in capacity, in piercing the cylinder shell with valved passages so that air or other working fluid can flow with minimum pressure drops from the atmosphere into the compressor chamber and from the motor chamber into the atmosphere again, and in using a pneumatic means for locating the cylinder with respect to a stationary framework. This construction enables operation on a Brayton cycle with low peak pressures and temperatures to result in light piston weights and high throughflow capacities. This combination of characteristics permit use of close clearance seals without oil lubrication to obtain radical reductions in the number of parts required and the tolerances to which each of these parts must be held.

The device of the present invention is susceptible of an unusually wide variety of uses. It can be used in VTOL aircraft where extreme light weight is at a premium, or in transport aircraft requiring both excellent fuel economy and long engine life, or in high supersonic missiles where tolerance to high inlet temperatures is necessary. In these aircraft applications, the present invention can be employed by itself as a jet propulsion device, or together with a turbine driving a fan or propeller or auxiliary power load, or as a source of oil-free air for breathing and conditioning purposes, or in any combination of these purposes. To such uses this engine brings quick starting, part load economy, rapid acceleration, and safety characteristics which can greatly increase the range of operation of the using aircraft. These same characteristics will secure for this engine a wide acceptance in the automotive, marine, and industrial fields.

The object of this invention is to provide an ultralightweight engine which can be assembled from a small number of parts most of which parts are simply formed to wide tolerances from sheet metal stock containing a minimum of strategic materials, and which will operate safely and economically for long periods of time under adverse operating conditions and with a wide variety of fuels. This object is attained thru the combination of the present invention with a number of other inventions related to the same object.

Since the present invention uses the same thermodynamic cycle as the gas turbine and its prospective usage encompasses the present usage of that type of engine, it would be well here to indicate the utility of this novel device by reciting the problems which the turbine engine is still unable to solve after a long period of intensive, and very expensive, development. These difficulties are directly related to the manner of interchange of energy between the motor and compressor means; namely, to the use of rotating blading for this purpose. In order to attain the high pressure ratios required for thermodynamic efficiency with the light aerodynamic loadings required for component efficiency, a very large number (usually over 2000) of blades is necessary. Each of these blades has a complex irregular shape and must be machined to close tolerances from materials which are worked only with difficulty. Each of these blades must then be supported in close clearance to a stationary surface while moving past it at bullet speeds and while the parts are subjected to intense vibrations and thermal gradients; necessitating a heavily stiffened structure elaborately compensated for temperature changes. The short central driveshafts dictated by such structure force the combustion chamber into an annular form in which both the fuel and temperature distributions are difficult to control as well as shortening the chamber to the point where its altitude performance is impaired. The very narrow operating characteristics of the bladed compressor worsens this last fault, since the pressure ratio decreases rapidly with any reduction in load and lowers both the absolute pressure and the chamber inlet temperature, to each of which the combusion process is sensitive. The closeness to a quench surface in the annulus inhibits starting and promotes coking, the fuel and temperature distortions impose complex control devices and limit the average turbine inlet temperature so the highest temperature will remain within limits, the shortness of the chamber and the compressor characteristic limit the maximum usable altitude to less than that for maximum economy or utility of the using aircraft. Each of these fuel limitations can be corrected by special treatments, but these drastically increase the cost of the fuel and make the engine operation uneconomical. The very large surface areas exposed to the hot gases, the high rates of heat transfer induced by the high velocities with which the gases scrub these surfaces, the low rates of heat transfer possible in the thin blades, the high loads induced by the rapid rotation, and the difficulties of protecting the exposed surfaces combine to block any substantial increase in turbine inlet temperature in spite of the well known large increase in power output that even a small temperature increase obtains. To approach the present moderate temperature levels has required the use of very costly materials of quite limited supply plus extremely complex control systems to maintain the temperature and rotational speed within narrow limits over a broad range of operation. The problems forced on this control during accelerations of the engine are worsened by the surge and rotating stall instabilities in the rotary compressor and cause a further growth in complexity to avoid blade breakage and burner blowout. These instabilities not only slow down the permissible rate of acceleration but also dictate a division of the engine into two or more rotors to reduce their influence; further complicating the structure and adding a large number of bearings to support the additional rotors and their drives, together with the lubricating lines and pumps needed to supply and scavenge oil for these bearings. Finally, there are the safety aspects of turbine engines to contend with. The high speed rotating flow at the inlet induces a miniature tornado which sucks up debris from the ground. The blades are very sensitive to impacts with such debris while the high speed of the flow causes excessive losses in screens which would prevent debris entry. The limited rate of acceleration requires the use of heavy thrust spoiler mechanisms or endangers the landing procedures. The narrow compressor characteristic inhibits the use of compressor air to overcome emergencies. The compressor instabilities limit maneuvers that would result in inlet air velocity distortions and force armament relocations to less advantageous positions. Gyroscopic forces induced by the rotating members further limit the aircraft's maneuvers and can actually result in dangerously unstable motions of the aircraft. The ubiquitous oil lines constitute an everpresent fire hazard and contaminate the air so it cannot be used for breathing and air conditioning, necessitating further complication in manned aircraft. The equally complicated fuel supply system imposed by the annular combustor arrangement forms an even greater fire hazard. Damage to the blades or the bearings will cause the rotors to disintegrate and the resulting explosion caused by the enormous stored energy of rotation cause the thousands of blades to act as so many machine gun bullets spraying the aircraft. As a result of all these factors, present turbine engines cost up to $100,000,000 to develop, require more than 6 years to bring to an acceptable degree of reliability, cost more than $40 per pound in high rates of production, weigh more than ¼ pound per pound of thrust in all but uneconomical and limited life versions, and consume about a pound of fuel to develope a pound of thrust at subsonic speeds. The fuel weight forms about half the gross weight of the aircraft so that a small change in it makes a large change in payload. The treatment this fuel must receive to overcome the tubine engine's limitations adds a large item to the aircraft operating budget. With the recent growth in size and number of aircraft, their fuel requirements are a large fraction of the national fuel supply. The problems of manufacturing such complex machines and supplying them with such vast quantities of special fuels constitutes a threat to the national economy in peacetime and to the national security in time of war.

The manner by which the present invention avoids the shortcomings noted above against the turbine engine while retaining the basic advantages of operating on the gas turbine cycle will appear below. Further objects of the invention will also be brought out in the following part of the specification, wherein detailed description is for the purpose of fully disclosing several embodiments of the invention without placing limitations thereon.

Referring to the accompanying drawings, which are for illustrative purposes only:

FIG. 1 is a section thru the present invention including a view diagrammatically showing the synchronizing controls and the lube air and fuel pumping means and a starting means.

FIG. 2 is a section taken substantially on line 2—2 of FIG. 1 and showing a typical valve actuator and signal means.

FIG. 3 is a view taken substantially on line 3—3 of FIG. 1 and showing a typical piston valve signal means on a developed surface.

FIG. 4 is a view taken substantially on line 4—4 of FIG. 1 and showing a typical cylinder valve signal means.

FIG. 5 is an enlargment substantially of the partial view encircled by the line 5 of FIG. 1.

FIG. 6 is an enlargment substantially of the partial view encircled by the line 6 of FIG. 1.

FIG. 7 is a view taken substantially on line 7—7 of FIG. 6, of a portion of a typical valve in the closed position.

FIG. 8A is a section taken substantially on line 8—8 of FIG. 6 and showing a typical valve in the closed position.

FIG. 8B is a section taken substantially on line 8—8 of FIG. 6 and showing a typical valve in the open position.

FIG. 9 is a section taken substantially on line 9—9 of FIG. 6 and showing diagrammatically a typical seal damping means.

FIG. 10 is a view taken substantially on line 10—10 of FIG. 6 and showing a typical seal member arrangement.

FIG. 11 is an embodiment of the present invention which utilizes natural heat as the motivating energy.

Referring now generally to the drawings, for illustrative purposes the invention is shown as a jet engine and as embodying a casing, a cylinder, a piston, and miscellaneous servicing and control means. The casing includes an inlet 20 by means of which ambient air may enter the engine, an inlet center body 21, a front casing 22, a center support 23, a rear casing 24, and a jet nozzle 25. This casing could form the aerodynamic fairing for the engine, in the case of pod-mounted nacelles, or a portion of the structure, in the case of buried engines. Inside this casing the cylinder is supported on air-lubricated bearings 26 and 27 so as to enable reciprocation parallel to the longitudinal axis of the engine. The interior of the cylinder contains two compressor chambers and two expander or motor chambers. For convenience, the left hand end of the compressor has been designated, in FIG. 1 and subsequently, by the letters LC while the right hand end of the compressor has been designated RC and the left and right hand ends of the expander by LE and RE respectively. The cylinder assembly includes the balance piston 28 on which the bearing 26 is mounted, the LC cylinder head 29, the LC cylinder valve 30, the compressor cylinder 31, the RC cylinder head 32, the RC cylinder valve 33, The cylinder stem 34, the LE cylinder head 35, the LE cylinder valve 36, the expander cylinder 37, the RE cylinder head 38, and the RE cylinder valve 39, together with the valve actuators 40, 41, 42, and 43 for the LC, RC, LE, and RE cylinder valves, respectively. Inside the cylinder assembly, the piston assembly is mounted on air lubricated bearings 44 and 45 at the compressor and expander pistons respectively and by another bearing formed inside the cylinder stem 34. The piston assembly includes a set of telescoping tubes indicated generally by the number 46, the LC piston head 47, the LC piston valve 48, the LC piston valve actuator 49, the flame holder 50, the RC piston valve actuator 51, the RC piston valve 52, the RC piston head 53, the piston stem 54, the LE piston head 55, the LE piston valve 56, the LE piston valve actuator 57, the RE piston valve actuator 58, the RE piston valve 59, and the RE piston head 60.

The interaction of the various assemblies may now be described. To assist in understanding this description, the motions of the various parts will be assumed to be those indicated by the arrows 61 and 62, with the cylinder and piston assemblies each moving in opposite directions above and below the centerline 63. This convention is followed only to reduce the number of drawings needed to describe the interactions and the assemblies are not to be taken as split at the centerline but rather as moving as unitary wholes first in the directions of the arrows 61 and then in those of arrows 62. The smaller arrows thru the valves of the cylinder and piston assemblies indicate the flows accompanying these motions. Thus, as the cylinder moves to the left and the piston to the right, air is drawn into the left compressor chamber from the atmosphere via the inlet 20 and the open LC valve 30. At the same time, air already compressed in the right compressor chamber flows into the piston thru the open RC piston valve 52. The gas in the left expander chamber is doing work by forcing the cylinder to the left and the piston to the right. The fully expanded gas in the right expander chamber is exhausting out thru the open RE cylinder valve 39 at a pressure higher than atmospheric. This pressure energy of the exhaust gases is then converted to velocity by expansion thru the jet nozzle 25. The greater momentum of the jet over that of the inlet flow provides the thrust to propel the engine and the using aircraft.

In the reverse directions, indicated by the arrows 62, a similar set of functions is performed. Air trapped in the left compressor chamber is compressed as the cylinder now moves to the right and the piston to the left. Atmospheric air that has entered thru inlet 20 is drawn thru the open valve 33 into the right compressor chamber by the lowered pressure resulting from the expansion of this chamber. The fully expanded gas in the left motor chamber is being forced out by the contraction of this chamber thru the open valve 36. The force required for all these actions is supplied by the pressurized gas flowing from the piston thru the valve 59 into the right motor chamber.

From the above description of function, it is apparent that there is a continuous flow into the engine, flowing one half the time into one compressor chamber and the other half of the time into the other compressor chamber. In the same way, there is a continuous flow out of the engine as each motor chamber exhausts for half the time. The functions of air compression and gas expansion in the respective chambers are entirely discontinuous, involving the valving in of a discrete amount of fluid, its isolation by closing of the entering valve, and its discharge thru another valve after performance of the function. The flow into and out of the piston is likewise discontinuous, since these flows occupy only a small fraction of the piston stroke time. The volume of the piston is so much larger than that of one fluid quantity change, however, that the consequent pressure fluctuating inside the piston is relatively small and the functions and flows there may be assumed substantially continuous. This engine, therefore, is an equivalent in function for the gas turbine engine in which rotary means are used to compress the air and to be motored by the gas. The present engine is also the equivalent of the gas turbine in providing straightline fluid passage from inlet to jet exhaust.

The fuel for the engine is pressurized in a pumping means 64 and flows thru check valve 65 and heat exchanger 66 into the set of tubes indicated generally by 67 and finally out of the fuel injector means 68. The spray from the injector progresses thru tube set 46 into the flame holder 50, where it mixes with air flowing into the holder thru mixing means 69, shown here as simple holes. The combustible mixture formed of the fuel and the air is ignited by the flame stabilized by the holder for that purpose and burns at a substantially constant pressure in a continuous process. The combustion products issuing from the holder flow thru the stem 54 accompanied, but not necessarily mixed with, the compressed air flowing thru the gap 70 between the holder and the stem. The stem is protected from the hot gases by this flow relatively cold air assisted possibly by an insulating layer 71. At the abrupt expansion 72 from the stem into the motor piston interior, the air and gas are mixed by the consequent turbulence into a substantially homogeneous mixture of cooler gases. During the passage thru the stem, however, the fuel has an excellent opportunity to complete combustion, since the gas core is extremely hot, the time of transit is relatively long, there are no flows of secondary air to quench the flame prematurely, and there are no cooled surfaces scrubbed by the flame which would also quench it. This length and long transit time for the flame are inherent in the construction of this engine, just as is the constant pressure combustion a consequence of the large volume naturally built into the piston interior. These combustion characteristics assist in burning fuels of low inflammability or ordinary fuels at extreme altitude where combustion proceeds only with difficulty. It may be noted here that the compressor characteristics are such as to provide the high pressure ratios and resulting high compressor discharge temperature that can assist altitude combustion, even at part loads, since the pressure ratio need not decrease with a decrease in either load or air flow.

Considering now the lube air system, compressed air flows out of the piston thru tubes 46 and 67 to heat exchanger 73 where it is cooled by atmospheric air or other coolant and then a portion is used to drive the turbine 74, or some other motor means, by expansion to a lower pressure thru valve 75. The work extraction in the turbine serves to further lower the heat content of this air so that it may be used to refrigerate other apparatus. Another portion of the original compressed air is further raised in pressure by passage thru the pump 76. One part of this high pressure air flows thru air cooler 77 and air to fuel heat exchanger 66 and back thru tubes 67 and 46 to the bearings, actuators, seals and valves in the piston assembly. Another portion serves an identical function in the cylinder assembly. Still another portion is available for similar functions elsewhere in the using aircraft.

The third service system shown in FIG. 1 is that of the locator. It is obvious that the air and gas pressures in the various chambers act to synchronize the motions of the piston and the cylinder. There is no such intrinsic synchronization of the cylinder motion with respect to the casing. This lack is filled by the locator system. It will be noted that the pressure in the rear casing 24 is higher than that existing in the front casing 22 and that the cylinder stem 34 penetrating the support wall 23 is of considerable area, so that a force of some magnitude is exerted on the cylinder tending to move it to the left. This force is counterbalanced by the pressure in chamber 78 acting on balance piston 28. The air in chamber 78 is compressed air from the piston which has passed through either check valve 79 or slide valve 80. This slide valve is positioned by the pressures in chambers 81 and 82 acting on the ends of the valve. These pressures are regulated by the position of the cylinder, and particularly of the passage 83 in the cylinder, with respect to passages 84 and 85 which are fixed to the casing. High pressure air flows into passage 83 thru pipe 86 so that at the end of each stroke a momentary passage is made with one or the other of the chambers 81 and 82. If the cylinder is in its proper position, the air flow thru this momentary passage will only be sufficient to replenish air lost thru normal leakage. If the cylinder shifts to the left, however, the flow to passage 84 will be of longer duration and the pressure in the corresponding chamber will rise while that in the opposite chamber will fall due the shorter time that passages 83 and 85 are aligned at the end of the stroke. The rise in pressure in chamber 82 pushes the slide 82 to the left, restricting the flow of air between chamber 78 and the piston. Since the compressed air from the piston has free access to the chamber on the expansion stroke thru the check valve 79, the average pressure in chamber 78, when integrated over the entire cycle, must increase over its former value. Since this former value was just sufficient to counterbalance the exhaust gas pressure on the cylinder stem, the new higher pressure will force the cylinder to the right and restore it to its proper operating position. If the cylinder is further displaced to the right, a very obvious line of reasoning will demonsrate that the pressure in chamber 78, as averaged over the entire cycle of a left and a right stroke, will then fall and the pressure unbalance will move the cylinder to the left to again restore it to its correct location. By proper sizing of the balance piston 28 and of the valve 80, the pumping loss in the locator circuit may be made negligibly small while the pressure forces can be made large enough to overcome any tendency to hang up.

Another service function displayed in FIG. 1 is that of the starter system. During normal running, high pressure air flows thru check valve 87 into accumulator 88. When the engine is shut down, valves 89 and 90 are closed, trapping a quantity of air in accumulator 88 and of fuel in accumulator 91. When starting, valve 75 is closed and valve 89 opened, providing lube air to the piston and cylinder and charging the piston, by passage thru pump 76 in the reverse direction, with moderate pressure air. All the piston valves are closed at this point. Valve 90 is then opened, spraying the accumulated fuel into the flame holder where it is ignited by the ignitor 92. The flame heats the air in the piston and further increases the contained air pressure. The cylinder is then rotated to bring the signal means into proper relation and the appropriate piston valve opens to start the engine into operating normally. Valve 75 is now opened to begin pumping lube air and fuel in the normal manner. As may be seen later, the air pressure before combustion in the piston during a start can be quite low, so that only a small volume is require in the accumulator 88. On the other hand, the gas demand per stroke at this time is also small, so that a large number of strokes can be made on one filling of air. Thus, the transition between starting and normal running can be made quite gradual and without any great demands on the control system. The valve timing, for example, does not need to change radically in the first stroke or even in the first few strokes. For this reason, starting is only a minor problem in this engine. Assisting in reducing this problem is the light mass of metal which needs to be heated during a start, the low friction under arctic weather conditions of the air lubricated bearings, and the large distortions from rapid temperature changes that these bearings can absorb.

The manner of operating the piston and cylinder valves and the character of these valves are best seen in FIGS. 2, 3, 4, 6, 7, 8A, 8B. FIG. 2 is diagrammatic in that the air lubricated bearing which should appear in this view is omitted for clarity. The other figures are also diagrammatic in including only small portions of the valves which are more fully described in my co-pending application for Spheral Segment Valve. These valves, as used in this engine, can be described as strips of material, usually sheet metal, arranged as longitudinal and latitudinal elements in a net, the midsurface of which is a spheral surface. The piston and cylinder heads are also made in the form of nets with identical meshes in the region of the valves. When the valve is oscillated, these meshes of valve and head are brought into alignment, permitting flow thru them. Further oscillation brings the longitudinal elements of the valve into alignment with the open mesh of the head, preventing flow thru the meshes.

Referring now specifically to FIG. 2, a section thru some of the longitudinal elements of both the head 47 and the valve 48 are shown, with the valve in the closed position. It will be noted that the distance between head elements is the same as that between valve elements, so that a small oscillation in the counter-clockwise direction will place these elements in coincidence and permit flow inward past them. The elements of the head 47 are rounded at the exterior in order to reduce resistance to such flow. The surface 93 common to both head and valve is most easily machined as a true sphere segment. The pressure and inertia loads which the heads of the pistons and cylinders have to carry, however, may necessitate some modification of this surface 93 to minimize distortion during operation. It is for this reason that the valve is described as a spheral, rather than as a true sphere, segment. Passages 94 supply high pressure air to an air bearing at each of the intersections of a longitudinal and latitudinal element. These bearings serve to lift the valve out of contact with the head when it is to oscillate, preventing any frictional contact and blowing out of the gap so formed any foreign material which might jam the valves or scratch the surfaces. The lifting force that these air bearings can exert is limited so that a pressure difference across the valve larger than a prescribed value will force the valve onto its seat and prevent opening of the valve. This locking feature of this valve dictates the use of an actuator which will position the valve very accurately when closing and will rotate the valve very quickly in order that it may be in the proper position before the rapidly changing pressures in the chambers can stop the valve motion. It can also be appreciated that the pressure drop thru the valve in the partially opened valve is much higher than it is thru the fully opened valve because of both the reduced open area and the square corners of the valve over which the air has to flow. The faster the valve is opened, the smaller the fraction of operating time that this high pressure drop condition exists and the smaller, therefore, the aerodynamic losses in the valving process. These aerodynamic losses are substantially reduced by the use of these valves with their large open area, approximately equal to the cross-sectional area of the cylinder, but the high velocities of the air thru them make any further reduction in these losses worth while. In passing it can be observed that the aerodynamic losses in the valves of a piston engine are almost the only losses that it suffers.

The novel actuator 49 is designed to provide such rapid and precise opening of the valve. It is energized by high pressure air entering thru passages 95 or 96. This air acts on the piston 97 which, in turn, acts thru linkage 98 to position valve 48. The sequence of motion is initiated by a momentary alignment of a slot 99 in the cylinder 31 with either of the passages 100 or 101. Slot 99 is shown do.ted to indicate that it is merely diagrammatic in this view. When the slot and passage are aligned, the air in the chamber connected with that passage can flow out thru the slot, causing the pressure in that chamber to drop. The pressure difference thus generated first causes the light shuttle valve 102 to move and shut off further flow of air into the chamber with the lower pressure so that the continued flow out of the chamber thru the slot causes a more rapid buildup in the pressure differential across piston 97. As the piston 97 starts to move under the force of this pressure differential, the piston lips 103 or 104 cover the passage opened by the slot 99 so that no further air can flow out. Continued motion of the piston compresses the air still trapped in the discharged chamber, building up the pressure there to a value higher than that at which the high pressure air was supplied. The reverse pressure differential serves to bring the piston and attached valve to a halt at the other end of the piston stroke, so that the motion is cushioned. At the end of the stroke, the slit 105 registers with the passage 100 and the resulting outflow of air drops the pressure so as to keep the piston seated against the end of the actuator cylinder. Since the air supplied thru passages 95 and 96 is at quite high pressures and the valve 48 can be made of thin and light material so as to offer little inertia, a very high velocity of valve motion can be obtained. Since the travel necessary to open or close the valve is relatively short, the time of travel with this high velocity is very small. The cushioned action prevents any impact loads that could damage the linkage or valve. The shuttle valve reduces the amount of air lost per stroke as well as speeding up the valve action. This shuttle valve 102 could also replace in part the slits 105, since the very high pressure developed by compression in the chamber could be made to act on the valve 102 and force it off its seat, allowing the compressed air to flow out into passage 95 or 96. Leakage of air past the piston to the open passage would then lower the pressure in the chamber, reseating the shuttle valve and creating again a pressure differential that holds the piston at the end of its stroke.

The slots that are used to signal the actuators for the LC and RE valves of the piston and cylinder respectively are shown in FIG. 3 and FIG. 4. Thus, slots 106 and 107 in cyclinder 31 control the LC piston valve actuator, while slots 108 and 109 control the RE piston valve actuator. The dash-dot lines 110 and 111 represent a path of the passages 100 and 101, respectively, over the inside surface of cylinder 31. Similar lines in the other views represent paths of similar passages. Starting from the left end of stroke, passage 100 first encounters slot 107, causing the actuator to close the valve to the position shown in FIG. 2. As the piston continues to move to the right, passage 101 encounters slot 106. At this time, however, the pressure differential across the LC piston valve is high, since the LC cylinder valve has opened and the pressure in the left compressor chamber has dropped to atmospheric. This pressure differential keeps the valve 48 seated against head 47 with sufficient force that the resulting friction prevents the valve 48 from opening. On the return stroke, however, as the piston moves to the left and compresses the air in the left compressor chamber, the pressure differential across valve 48 decreases as the pressure in the chamber rises. Just as passage 101 crosses slot 106, the pressure differential falls to zero, permitting free opening of the valve. The pressure differential at the end of the stroke is still zero, so that closing of valve 48 is also readily accomplished. It should be understood, however, that the air bearings in the valves can be readily made strong enough to overcome a considerable pressure differential, so that any mismatch in timing would not have serious consequences. In fact, the solid film lubricants with which these valves would be coated could permit the valve to operate properly for a short time without the air bearings because they would allow slipping under low pressure differentials while their relatively high coefficient of friction would still prevent motion under high pressure differentials. This situation, of needing a friction lock to prevent valve opening, does not occur with the motor piston valves. As the motor piston proceds to the right, it first encounters slot 109 which signals the RE piston valve 59 to close. This valve is already closed, however, so that no action results. At the right end of the stroke, slot 108 signals this valve to open and the resulting gas pressure forces the piston assembly to the left. As the piston assembly passes slot 109, the RE piston valve closes in response to its signal. All of the slots are slanted to the axis of the engine so that a rotation of the cylinder about this axis will change the timing of the valves. For example, if the slots are rotated so that in these diagrams they move vertically downward, the actuator signal passages will encounter the slots nearer the ends of the cylinder so that a larger volume of air and gas is handled at each stroke. By proper shaping of these slots, the pressure ratios in the chambers can also be changed by this rotation of the cylinder.

The control of the cylinder valves is very similar to that for the piston valves. The slots 112 and 113 in cylinder 31 control the LC cylinder valve 30, while slots 114 and 115 in cylinder 37 govern the RE cylinder valve 39. As indicated in FIG. 1, however, the cylinder valve actuators are of the momentary close type in that air flows in thru the slots and connecting passages to the actuator, rather than out as in the case of the piston actuators. For example, when slot 113 passes under the passage 116 which is connected to the high pressure air supply, air flows thru the passage 117 to the actuator, where it acts in the same way as does air entering thru passage 96 into the piston valve actautor shown in FIG. 2. For the case shown in FIG. 4, as the cylinder assembly moves to the right past the stationary passage 116, slot 113 allows air to flow to the LC cylinder valve actuator 40 to close the valve 30. Continued motion to the right permits a flow signalling the valve 30 to open. At this point, however, the air trapped in the left compressor chamber has risen in pressure by virtue of compression until the pressure differential across the valve will not permit it to open. On the return stroke, the expansion of the air in the clearance space has lowered the pressure differential to the air in the front casing and the valve can open. At the end of the stroke, slot 113 again signals the valve to close. In the same manner, motion of cylinder 37 past passage 118 causes high pressure air to flow thru passage 119 into actuator 43 and so close valve 39. If the motion of the cylinder is to the right from the end of stroke, the first encounter will be with the valve already closed so that no action results. Continued motion to the right will bring slot 114 under a similar stationary passage to 115 and valve 39 is opened, so that discharge of the expanded gas in the right motor chamber can commence. Rotation of the cylinder alters the timing of the cylinder valves also so that both volumes and pressure ratios can be changed at will.

At the same time that the timing of the piston and cylinder valves is altered by rotation of the cylinder about its axis, it would be preferable to also change the fuel rate of flow. One means for accomplishing this is shown in FIG. 5, where needle 120 can be moved along the engine centerline 63 to alter the area between itself and nozzle 121 and so control the volume rate of flow of the fuel spray 122.

The major difficulty presently conceived from high gas temperatures is their deleterious action on the materials of the motor piston head and its valves. The pressure differentials due the compressed air in the piston and the lower pressure exhaust gases on either side of these members induces relatively high stresses in the thin walled shell construction. In order to stand these stresses, the head and valve materials must be kept cool. The present engine construction permits very strong cooling of these parts while at the same time reducing the amount of heat that is transferred to them in a given time interval. These factors may be seen in FIGS. 6, 7, and 8. The sections thru the motor piston head and valve shown in FIGS. 8A and 8B indicates a preferred embodiment, wherein the longitudinal elements of the head are somewhat hat-shaped and have high pressure air passages 123 thru them. On the outside of the head elements, an insulation 124 is used to reduce heat transfer to the elements from the motor chamber, while insulation 125 protects valve 56 from hot gases in the motor piston. When the head and valve elements are aligned, as shown in FIG. 8B, an almost circular cylinder results, with the insulation protecting all but a very small fraction of the periphery. It may be recalled that the high pressure air in passages 123 was cooled before entering the piston assembly. This cold air now absorbs the heat flowing thru the insulation and keeps the head and valve materials cool, as it flows thru passages 123. This same air also flows in the gap between head 55 and valve 56 from the holes 126 at every intersection of latitudinal and longitudinal elements, further cooling the surfaces which are exposed when the valve is in the closed position. The low level of turbulence in the piston and in the motor chambers does not result in any distress from heat transfer to these surfaces when the valve is closed. When the valve is opened, the total area exposed to the hot gas is the least possible and the gas velocities thru the valves are relatively low, so that the heat transfer is only moderate. This is a great advantage in comparison to either the ordinary piston engine or a gas turbine. The discharge velocities thru an exhaust valve in an ordinary piston engine are very high, because of the large pressure differentials at the time of valve opening, so that large heat transfers result. The mechanism of these valves, moreover, prevent the application of insulating materials to protect the valves, so that they are easily burned and so limit the reliability of the engine. As previously described, the gas turbine has also very high gas scrubbing velocities while the turbine blade shapes make the exposed surfaces very large and the use of strong cooling very difficult. As a result and in spite of enormous ingenuity on the part of gas turbine designers and metallurgists, the turbine inlet temperatures which can be handled safely are still quite low. In the present engine, on the other hand, the small exposed areas and the low scrubbing velocities and the ease of the insulating and the ease of cooling all combine to permit a considerable increase in motor chamber inlet temperatures over those found in turbines using the same materials or else the use of lower alloyed materials of less cost with the same inlet temperatures.

The preferred embodiment of the air lubricated bearings and seals used in this engine is shown in FIGS. 6, 9, and 10 for the specific case of the motor piston. Ring 45 is split and lap-jointed to permit expansion to suit that of the surrounding cylinder 37 and is sufficiently flexible in the circumferential direction to conform to small out-of-roundnesses due to temperature distortions of the cylinder. On the outer surface of the ring are recesses 127 while the inner surface has circumferential groove and concave depressions. Between the ring and the piston are located a flexible tube 128 and flexible spheroids 121; the tube seating in the groove in the ring and in a similar groove in the piston while the spheroids seat in the depressions in the ring and in similar depressions in the piston. Also between the ring and the piston are flexible straps 130 which are joined to both ring and piston and act to prevent motion of the ring sidewise parallel to the engine axis but do not hinder radial or circumferential motion of the ring. High pressure air flowing thru passages 123 is conducted via passage 131 to tube 128 where it serves to inflate the tube and so urge the ring outward against the cylinder 37. Some of this air flows thru restrictive passages 132 to the recesses 127. Since the gap between the ring and the cylinder is small, the flow of air from the recess is small and a pressure builds up which forces the ring away from the cylinder until the flow thru the gap equals that thru the restrictive passages 132. With a compressible fluid, such as air, this action is unstable and would lead to a rapid vibration of the ring which would impair its function. This instability is dampened by the action of the incompressible fluid in the spheroids 129. The high pressure air in passages 123 also acts thru passages 133 on piston 134 in cylinder 135 to pressurize incompressible fluid 136. This fluid flows thru piping 137 and the restrictive passages 138 into the spheroids 129. As the ring moves radially outward, the force exerted by the spheroid on the ring momentarily decreases, since the restrictive passage 138 inhibits flow of the incompressible fluid 136 thru it into the spheroid in spite of the large pressure differential imposed thru piston 134 by the high pressure air. When the ring attempts to move radially inward, the spheroid imposes a strong resistance to such motion since the contained fluid must first be pushed out thru restrictive passage 138. This action is assisted by contouring the depressions in which the spheroids are seated so as to cause a rapid increase in the area of contact between spheroid and ring as the ring moves inward. By varying the relative contact areas of the tube 128 and the spheroids 129 and by using a differential area piston instead of the plain piston 134 to increase the pressure exerted on the incompressible fluid, the amount of radial load that is carried by the spheroids and the damping effect that they obtain can be changed as desired. Separate dampers, as the spheroids shown, are advisable since the ring can vibrate torsionally and circumferentially as well as radially, especially if the ring is sufficiently flexible to conform to fairly large distortions of the light cylinder walls. The walls 139 shield the ring and the spheroids from the gases while air thru the passages 140 blows these gases out of the region between the ring and piston and keeps the members cool. The tube 128 is lap jointed to permit expansion circumferentially and so keep at all times a gas tight fit against both ring and piston. Since the flow of air out of the recesses 127 thru the gaps between the ring 45 and the cylinder 37 prevent the flow of gas from one side of the piston to the other, a perfect seal is formed. At the same time, due to the variation in radial force with deflection due to the change in area between the contoured contacting surfaces and the tube 128 and the spheroids 129, there is a strong resistance to any sideways motion of the piston as a whole, so that these elements act as a bearing. The virtues of this combination are many: the frictional resistance to very high speed motion of the piston is extremely low in comparison to any oil lubricated sealing device and in comparison with the power generated by the piston, the resistance to destructive vibrations is much greater than that enjoyed by even slow speed cranked piston engine sealing devices, there is no need to cool the walls of the engine to the very low temperatures required to prevent breakdown of a lubricating oil, the high velocity of the air out of the gaps between piston ring and the cylinder blows away any foreign matter before it can lodge in the gap or corrode the walls, there is no extra fluid to create a logistics or storage problem or add to the cost of operation, and there is no contamination of the air which can cause damage to delicate apparatus or prevent its later use in breathing. There is an obvious increase in complexity and cost over an ordinary oil lubricated piston ring but this relation is offset when the complete accessory systems of oil and air lubricated piston rings are compared. Of special benefit to the present object of providing an ultralight weight, low cost engine are the reductions in cooling equipment weights and the increase in manufacturing tolerances and operating distortions that these air bearing seals make possible. When coupled to the great increases in power output made possible by the extreme piston speeds and the very high motor chamber inlet temperatures, also made possible by the air bearing-seals in combination with the present construction and the spheral valves, it is obvious that this object can be more than met, at least in respect to very low weight to power ratios.

In review, it will be apparent to one skilled in the art that the novel pressure shell construction of the present invention not only has utility in its own right but also by virtue of facilitating incorporation of other improvements. By reducing to an absolute minimum the weight of material required to transmit energy from a motor device to a compressor device, a light weight machine results. By utilizing a constant pressure combustion cycle on which to operate, the pressure loads to which this structure is subjected are minimized, permitting another reduction in weight to power ratio. This same cycle minimizes the pressure differentials causing flow thru the valves and so the velocity of such flow and so, in turn, the heat transfer to the valves. This reduction of flow velocity thru the valves is assisted by the very large open areas provided by the spheral segment valves which can be easily fitted to the present construction. The construction also reduces to a minimum the surface exposed to the hot gases and provides, in the case of the combustion flames, a ready means of preventing contact with the surfaces without at the same time quenching the flame. This construction also facilitates insulation of the pressure load carrying members from the hot gases and their cooling by internal air passages. The combination of small heat transfer and strong cooling allows the motor inlet temperature, and hence the power output, to be very substantially increased for another improvement in power to weight ratio. In a free piston engine, any reduction in piston weight automatically results in an increase in piston speed. In the present engine, where the piston and cylinder move in opposition, this increase in piston speed is compounded, so that a very high relative piston speed is obtained with the present construction. In an ordinary piston engine, such an increase in piston speed would be limited by either choking in the valves which have a low ratio of effective open area to piston area, or by combustion problems arising from the intermittency of injection and burning, or by the friction losses between the piston and cylinder due to shearing of viscous oil films, or by breakage of the simple piston rings from the vibrations induced by high speed over thin oil films or by impact against the retaining walls in the ring groove. As set forth in the preceding paragraphs, each of these limitations are overcome in the present engine so that the extreme piston speeds made possible by the present construction can be utilized to the full. With the present construction, and the spheral valves made possible by it, the clearance spaces in the compressor necessary to permit operation of the valves can be reduced to almost zero. As a consequence, the volumetric efficiency of the compressor is almost perfect, particularly in view of the low pressure drops experienced by the flow thru the large inlet valves. With such good volumetric efficiency and high piston speeds, the rates of flow per unit of frontal area thru this engine can approach those found previously only in turbine type engines. In the present engine, however, all flows are with favorable pressure gradients and at low speeds, in contrast to the flows at high speeds and against adverse pressure gradients in the turbine engine, so that the efficiency of the compressors and motors in the present engine are considerably higher than those in the turbine engine. This combination of high rates of thru-flow with high component efficiencies obtains yet another increase in power to weight ratio. With power outputs per volume of engine greater than those of turbine engines and with obviously very much lower weights per unit volume than such engines, it is apparent that the present construction provides a much lighter engine per unit of power than any other presently known.

It will also be apparent to one skilled in the art that this novel construction has further utility in providing power at a low cost. One so skilled will see, for example, that only a small number of parts are required to build this engine as against the much greater number required for any other airbreathing engine, except possibly a ramjet. Most of these few parts, moreover, are simply formed from stock sheet-metal and standard materials. The air lubricated bearing-seals permit large tolerances in the machining of the inside surface of the cylinders and the outside surface of the cylinder and piston stems. The thin sheet metal construction of the valves permits them to conform to the heads in spite of large machining tolerances here. Extremely close machined clearances are not specially wanted in the valve actuators since the leakage of cool air past the pistons will improve their action and keep them cool. Leakage is likewise required in the locator slide valve. The various signaling devices for the cylinder valves can obviously be simplified and reduced in cost by grouping into a single tube set, preferably at the center support 23. This tube set could also function as the key by means of which the cylinder is rotated to change the control settings. Only the turbocompressor and fuel pump set (74, 76, and 64) would require expensive machining and even here the use of air lubricated bearing-seals would minimize costs of manufacture. The present construction, therefore, will result in a low first cost. Further, the demands for materials in limited supply will also be limited, if not reduced to zero. The high thermodynamic efficiencies mentioned above and the excellent fuel burning capabilities also mentioned will combine to give a good fuel economy. The small number of parts, the small loads to which these parts are subjected, the absence of wearing contact or corrosion, the ability to absorb large distortions without distress, and the ease of repairing or replacing machined surfaces will also result in a low cost of maintenance.

A more subtle benefit of the new construction is in the operational safety that it provides. The safety with which modern aircraft can be operated depends to a very large degree upon their engines. The present engine avoids a large number of difficulties that have made previous engines unsafe. There is no vortex forming tendency to suck debris into the inlet and any air-borne debris will fall to the bottom of the front casing because the velocities there are not high enough to sustain it, or will be screened out by the perforated cylinder heads, or, if it passes through one screen, will pass through all. There is no oil to pick up dust and form a wearing compound on the walls; on the contrary, the jets of air from the air-lubricated bearings prevent the dust from lodging. Modern solid-film lubricants can be easily applied to such bearings to permit emergency operation without air. The inherently broad characteristics of the surge and stall free compressor provide not only ample power and compressed air in an instants notice but also enable throttling back to a negative thrust condition to assist in landing; while still giving full thrust in a small fraction of a second in case of a waveoff. These characteristics also make the engine quite insensitive to inlet flow distortions during maneuvers. There are no gyroscopic forces to limit such maneuvers. There is no oil to cause a fire hazard or to contaminate the breathing air. The single fuel line is buried where it can cause little damage. With the present construction, the engine cannot run away in event of a control failure and, if a failure does occur, there is only the pressure energy of the gas in the piston to cause damage and this is easily contained in the surrounding cylinder as in normal operation.

Other benefits previously mentioned are the ability to operate at extreme altitudes and at very high Mach numbers and with a wide range of fuels, all with excellent efficiency.

Finally, it will be apparent to one skilled in the art that the present construction is susceptible of extensive modification without departing from the spirit of the invention. Although the preferred embodiment is shown as a jet propulsion device, it is obviously useful as a gas generator or air compressor as well. With such wide variety possible to the novel construction, it is obvious that only a few modifications can be named or shown within the limitations of this application and a larger number un-named may be inferred by one skilled in the art without departing from the spirit of my invention, and, hence, I do not wish to be restricted to the specific forms shown or uses mentioned, except to the extent indicated in the appended claims.

It is equally obvious that the auxiliary means could undergo even more radical change without departing from the spirit of the invention. The turbomachine pumping means described could be replaced by, for example, directly connected reciprocating pumps. The air used for lubrication could be replaced by any other fluid, including petroleum-base oils. The balance piston 28 and the associated pneumatic devices and controls could be replaced by any elastic restoring means, such as a spring, acting between the cylinder and the casing. The valve actuating means, shown as pneumatic, could equally well be hydraulic or be replaced by a mechanical means, also responsive to changes in the chambers, such as the mechanical means employed in the so-called "locomotive air compressors." The valves in the compressor portion, shown as mechanically actuated by pneumatic actuators, could equally well be actuated directly by the pressure differentials existing at various times across these valves, in the same manner as the reed or feather valves in commercial air compressors.

The major components are equally susceptible of change within the scope of this invention. The engine could be made single acting with "bounce" restoration by locking closed the RC and LE piston and cylinder valves and filling the RC and LE chambers with air at a suitable pressure. The combustion chamber could be replaced by any other heating means, such as a nuclear reactor or a solar furnace (more precisely, a heat exchanging means raised in temperature by focusing upon it the radiant energy from a nuclear fusion source, such as the sun).

Another embodiment of the present invention, illustrating but not limiting in either scope or number some of the above-mentioned permissible changes, is shown in FIGURE 11. In this variation, the cylinder assembly is stationary, the piston assembly has been simplified to a single ball, the operation is single acting with spring return, valve operations are mechanical, oil and dry-film lubrication is employed, and the motivating energy is derived from the sun. To clarify the functional similarity of this embodiment with that previously described, a detailed description follows.

The cylinder assembly 143 has a left-hand head pierced by radial slots 161 through which atmospheric air can flow into compressor chamber 142. Just inside this head is a star-shaped reed-valve assembly which has a reed 162 covering each of the slots. These reeds are elastic and open to permit flow when the pressure outside the chamber is higher than that inside but close to prevent any outflow when the pressure differential is reversed. The spring 141 pushes the piston assembly to the right-hand end of the cylinder (the piston is shown away from this end for clarity). A wick type lubricator 144 lubricates the piston as it moves past the decrease friction between the piston and the cylinder and to assist sealing the piston to the cylinder. The piston has a left-hand head pierced by radial slots 154. Just inside this head is a star-shaped reed valve assembly which has a reed 155 covering each of the slots to permit only flow from the compressor chamber into the left portion 156 of the heating chamber. In the middle of the piston is a heat exchanger 157 having passages 158 for flow from the left portion to the right portion 153 of the heating chamber. Separation of these two portions and support of the heat exchanger is afforded by the plenum 164. Flow out of the right is prevented by the spheral segment valve 151 closing slots through the right-hand piston head 171. These slots are radial to an axis transverse to that of the cylinder and passing through the valve pivot 160. To the right of the piston is the motor chamber 172. Flow out of this chamber is through the slots in the spheral segment valve 173 (shown in the open position) and in the head 174. These slots are also radial to an axis that is transverse to the cylinder. Beyond the right-hand cylinder head is a collector 175 in open communication with the exhaust pipe 150 through which pressurized hot gas can flow to do useful work as indicated by the arrows 149.

The operation of the spheral segment valves is as follows. Motion of the piston from the position shown towards the right will bring the piston rim 165 into contact with the stop 167 on the slide 163 and move it to the right as well. The stop is connected by the flexible link 168 with valve 173 so that this motion forces the valve to rotate counter-clockwise to the closed position. Further motion of the piston to the right (permitted by the flexible link) brings lever 146 against stop 148 and forces the lever to move to the left (with respect to the piston). This causes the valve 151 to which the lever is fixed to rotate counter-clockwise to the open position. When the piston moves to the left again, the lever contacts the stop 145 and forces the valve back to the closed position. Continued motion to the left brings rim 165 eventually into contact with stop 159 (which is to the right of the position shown) and moves slide 163 to the left and, by means of link 168, rotates valve 173 into the open position again.

A split spring ring 166 is placed in a groove in the piston rim to assist in sealing the piston to the cylinder.

Transferal of solar energy to the compressed air in the piston is by radiation to the (black-body) heat exchanger and by convection from the heat exchanger to the air. The sun's rays 152 are focused by mirrors 178 and 179 to shine through infra-red transparent windows 177, 176 and 169 on heat exchanger 157. The heat in these rays increase the temperature of the exchanger. Any air flowing through passages 158 will be subjected to this higher temperature and be increased in temperature by convection.

The window 176 in collector head 170 is designed to withstand the pressures within this head and prevent leakage past it. The same is true of the other two windows with respect to the heads in which they are mounted.

When starting, the piston is pushed by spring 141 to the extreme right end of the cylinder, closing valve 173 and opening valve 151. The sun's rays are brought to the position shown by 152 and the exchanger brought to a high temperature. A charge is placed in chamber 147 and fired to generate a high pressure in both the motor chamber 172 and the heating chamber in the piston. This pressure causes the piston to move to the left and force valve 151 closed, trapping pressurized gas and air inside the piston. As the piston continues to the left, the pressure in the motor chamber drops while that in the compressor chamber rises. The pressure in the compressor chamber eventually becomes higher than that inside the piston and a charge of compressed air flows into the heating chamber. After contacting stop 159 and opening valve 173, the piston is brought to a halt by the pressure differential between the compressor and motor chambers plus the force exerted by spring 141 and starts back to the right. On the way back the air in the piston is being increased in temperature and pressure by the transferal of heat from the exchanger. As spring 141 continues to push the piston to the right, the gas in the motor chamber 172 is driven into collector 175 and exhaust pipe 150. Nearing the end of the stroke to the right, the piston contacts stop 167 and forces valve 173 to close so that gas is trapped in the motor chamber and raised in pressure again by the piston motion. Further motion to the right brings lever 146 against stop 148 and causes valve 151 to open. The pressurized mixture within the piston can then flow into the motor chamber, raising the pressure there still further. (Normally, valve 173 operation would be so designed that the compression of gas in the motor chamber at the end of motion to the right would minimize the pressure differential across valve 151.) The pressure in the compressor chamber 142 has fallen below atmospheric while the piston was moving to the right, causing reed valve 162 to open and allow air to flow into chamber 142. The pressure differential between the compressor and motor chambers now counteracts the influence of spring 141 and the piston starts to the left again. The sequence that follows of piston motion and valve operation is the same as that previously described from the starting. All this and subsequent time, of course, the sun's radiant heat has been received by the exchanger for transferral to the compressed air.

It should be pointed out here that a real difference exists between the pressure shell construction of the present invention and the domed cylinders and valved pistons that have been used in the past. A pressure shell is usually taken to be a structure whose thickness is less than one-tenth its radius of curvature and which is shaped to resist internal or external pressure loads primarily by tension or compression of the shell material. The present piston valving is novel not only in conforming to this restriction but also in that a unitary piston has both inflow and outflow valves to a connected cavity or chamber.

I claim:

1. In an engine, the combination comprising: a structure; a cylinder mounted for reciprocation in the structure; a piston mounted for reciprocation in the cylinder, and forming with the cylinder a motor chamber and a compressor chamber, and containing a cavity in valved communication with the motor chamber and in valved communication with the compressor chamber, and having an injecting means connected with a supply of a fuel for injecting the fuel into the cavity, and having an igniting means for initiating combustion of the fuel in a flow of a fluid through the cavity.

2. In an engine, the combination comprising: a structure; a cylinder mounted for reciprocation in the structure, and having a pressure shell construction; a locating means for maintaining the reciprocating cylinder in a desired relation to the structure; a piston mounted for reciprocation in the cylinder, and having a pressure shell construction, and forming with the cylinder a motor chamber and a compressor chamber, and containing a cavity in valved communication with both the motor chamber and the compressor chamber; a supply of a fuel; and a combustion means for releasing the heat energy of the fuel within the cavity.

3. In an engine: a structure; a cylinder reciprocatably mounted in the structure, and having a wall with a hole thru it, and having a valve for controlling a flow of a fluid thru the hole; locating means for maintaining the reciprocating cylinder in a desired positional realtion with the structure; a piston reciprocatably mounted in the cylinder, and forming with the cylinder an expansible motor chamber and an expansible compressor chamber, and having a wall adjacent to the motor chamber with a hole thru the wall, and having a valve means for controlling a flow of a fluid thru the hole communicating with the motor chamber, and having a wall adjacent to the compressor chamber with a hole thru the wall, and having a valve means for controlling a flow of a fluid thru the hole communicating with the compressor chamber; and valve controlling means responsive to the position of the piston with respect to the cylinder for operating the piston valve means; and valve controlling means responsive to the position of the cylinder with respect to the structure for operating the cylinder valve means.

4. In an engine having an expansible compressor chamber and an expansible motor chamber: a piston having a first wall exposed to the compressor chamber and a second wall exposed to the motor chamber; a passage opening on said first wall and said second wall and communicating for fluid flow between the compressor chamber and the motor chamber; a first valve means in said passage for controlling flow from the compressor chamber into the passage and a second valve means in the passage for controlling flow from the passage into the motor chamber; and means for heating a fluid by combustion of a fuel in the passage intermediate to the two said valve means.

5. In a reciprocating cylinder locating means: a structure having a partition and containing a fixed cylinder; a reciprocating cylinder mounted for reciprocation in the structure and penetrating the partition and exposed to a fluid pressure differential across the partition tending to force the cylinder in a first direction; a piston means fixedly connected to the reciprocating cylinder, and forming with the fixed cylinder adapted for cooperating with the cavity to form an expansible chamber; a passage opening into the chamber and communicating with a supply of a fluid having a pressure that remains substantially higher than those pressures found on either side of the partition, said pressure operating on the piston means tending to force the cylinder in a direction opposite to the first direction; a valve means in said passage for restricting the flow of the fluid between the supply and the chamber, said valve means being responsive to the location of the reciprocating cylinder with respect to the structure; and a one-way valve means permitting flow of the fluid past said restricting valve means from the supply to the chamber.

6. In a wall of an expansible motor chamber: a plurality of holes in regular array thru the wall; passages in the wall for the circulation of a cooling fluid therein and the removal of heat transferred to the wall; an inculating coating for the resisting of heat transfer to the wall; a valve plate rotatably mounted on the wall in close clearance therefrom, and having an array of holes thru the plate similar to those thru the wall so that a small rotation of the plate will bring the plate holes and the wall holes into coincidence for permitting fluid flow therethru and a small rotation in the reverse direction will bring the impervious portions of the plate into coincidence with the wall holes for preventing fluid flow therethru, and having an insulating coating for resisting heat transfer to the plate.

7. An engine comprising a cylinder assembly, a piston assembly mounted for reciprocation on the cylinder assembly and cooperating with the cylinder assembly to enclose an exapansible compressor chamber and an expansible motor chamber and having a wall enclosing a heating chamber and having a valved intake passage through the wall leading from the compressor chamber into the heating chamber and having a valved discharge passage through the wall leading from the heating chamber into the motor chamber, and a heating means in the heating chamber having a temperature higher than any temperature of the wall for heating a fluid in transit between the compressor chamber and the motor chamber.

8. A free-piston hot-gas-generator engine comprising a casing having an inlet portion communicating with a supply of air and having an exhaust portion, a cylinder assembly mounted for reciprocation on the casing and having a compressor cylinder in valved communication with the inlet portion and having a motor cylinder in valved communication with the exhaust portion, a piston assembly mounted for reciprocation on the cylinder assembly and having a compressor piston cooperating with the compressor cylinder to enclose a compressor chamber in which the air can be compressed and having a motor piston cooperating with the motor cylinder to enclose an expansible motor cylinder in which combustion products can expand to do work and having a wall enclosing a combustion chamber and having a valved passageway through which compressed air can flow intermittently from the compressor chamber into the combustion chamber and having a valved passageway through which combustion products can flow intermittently from the combustion chamber into the motor chamber, an injecting means connected to a supply of fuel for injecting the fuel into the combustion chamber, and an igniting means for igniting the fuel for combustion in the compressed air in the combustion chamber.

References Cited

UNITED STATES PATENTS

| | | | |
|---|---|---|---|
| 1,013,907 | 1/1912 | Taylor | 60—39.63 |
| 1,103,223 | 7/1914 | Reynolds | 123—81 |
| 1,302,582 | 5/1919 | Norman | 60—39.63 |
| 2,042,820 | 6/1936 | Bax | 309—31 |
| 2,407,790 | 9/1946 | Tourneau | 123—46 |
| 2,512,909 | 6/1950 | Beaven | 123—47 X |
| 2,591,230 | 4/1952 | Bertrand | 309—31 |
| 2,657,960 | 11/1953 | Latimer-Needham | 309—4 |
| 2,776,864 | 1/1957 | Powlas | 309—4 |

FOREIGN PATENTS 803,388    4/1951    Germany.

CARLTON R. CROYLE, Primary Examiner

U.S. Cl. X.R.

60—247